(12) United States Patent
Howe et al.

(10) Patent No.: US 10,169,753 B2
(45) Date of Patent: Jan. 1, 2019

(54) METHOD AND SYSTEM FOR MAINTAINING PRIVACY IN THE INFERENCE OF MERCHANT GEOLOCATIONS

(71) Applicant: MasterCard International Incorporated, Purchase, NY (US)

(72) Inventors: Justin X. Howe, San Francisco, CA (US); Bruce MacNair, Stamford, CT (US); Andrew Reiskind, Armonk, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 448 days.

(21) Appl. No.: 14/745,723

(22) Filed: Jun. 22, 2015

(65) Prior Publication Data

US 2015/0371211 A1 Dec. 24, 2015

Related U.S. Application Data

(60) Provisional application No. 62/014,897, filed on Jun. 20, 2014.

(51) Int. Cl.
*G06Q 30/06* (2012.01)
*G06Q 20/32* (2012.01)

(52) U.S. Cl.
CPC ......... *G06Q 20/3224* (2013.01); *G06Q 30/06* (2013.01)

(58) Field of Classification Search
CPC ................................................. G06Q 20/3224

USPC .......................................................... 705/39
See application file for complete search history.

(56) References Cited

U.S. PATENT DOCUMENTS

| | | | | |
|---|---|---|---|---|
| 2008/0110978 | A1* | 5/2008 | Blume | G06Q 20/04 235/380 |
| 2013/0290119 | A1 | 10/2013 | Howe et al. | |
| 2014/0006097 | A1* | 1/2014 | Groarke | G06Q 30/02 705/7.29 |
| 2014/0129596 | A1 | 5/2014 | Howe et al. | |
| 2016/0314464 | A1* | 10/2016 | Carlson | H04W 4/029 |

* cited by examiner

*Primary Examiner* — William E Rankins
(74) *Attorney, Agent, or Firm* — Buchanan Ingersoll & Rooney PC

(57) ABSTRACT

A method for inferring a merchant geolocation includes: storing a plurality of transaction data entries, each including an account identifier, merchant identifier, and transaction time; storing a plurality of merchant profiles, each including a merchant identifier and geolocation; identifying a first set of transaction data entries, each entry including a common merchant identifier; identifying a second set of transaction data entries, each entry including a different merchant identifier corresponding to a merchant within a predetermined distance of a merchant corresponding to the common merchant identifier; transmitting an identification value associated with each transaction data entry in the first and second sets; receiving geolocation data entries for each identification value, each entry including a location time and geolocation; and identifying an updated merchant geolocation for the merchant corresponding to the common merchant identifier based on the geolocation included in geolocation entries that match transaction data entries in the first set.

18 Claims, 6 Drawing Sheets

METHOD AND SYSTEM FOR MAINTAINING PRIVACY IN THE INFERENCE OF MERCHANT GEOLOCATIONS

FIELD

The present disclosure relates to the maintaining of privacy in the inference of merchant geolocations, specifically the use of mobile device geolocation data in combination with transaction data to infer merchant geolocations while obscuring the data used in order to maintain consumer privacy.

BACKGROUND

Knowing the precise geographic location ("geolocation") of a merchant can be valuable for a variety of reasons. Most notably, mapping applications on consumer computing devices may often require geolocation information for merchants in order to both accurately draw maps of geographic areas and provide GPS-assisted navigation information to the consumer and other users. Inaccurate geolocations for merchants may therefore lead to inaccurate maps and inaccurate navigation directions provided to users, which could be damaging to a service's reputation. As a result, mapping and navigation services may desire updated and accurate merchant geolocations to improve their services.

However, many current methods for identifying merchant geolocations are often too error-prone, time consuming, and/or inefficient. For example, one method for identifying merchant geolocations includes having an employee physically visit merchant locations and identify the geographic coordinates, or other suitable representation, of the merchant location. However, this can require a vast amount of resources and time, especially on a large scale, and can be inaccurate without obtaining multiple measurements at each merchant. In another example, merchants may self-report their geolocation to the service. However, the gathering of such data may be time consuming, and may also be inaccurate as it relies on the merchants to self-report geolocation information, who may not provide proper or accurate data.

Many consumers that shop at various merchants often are in possession of a mobile computing device that is configured to report its geolocation. As such, the geolocation data of these mobile computing devices may be ideal for inferring a merchant geolocation. Thus, there is a need for a technical solution to infer merchant geolocations using mobile computing device geolocation data in combination with transaction data, while still maintaining a high level of privacy for consumers and other users of the mobile computing devices.

SUMMARY

The present disclosure provides a description of systems and methods for inferring a merchant geolocation.

A method for inferring a merchant geolocation includes: storing, in a transaction database, a plurality of transaction data entries, wherein each transaction data entry includes data related with a payment transaction including at least an account identifier associated with a payment account involved in the related payment transaction, a merchant identifier associated with a merchant involved in the related payment transaction, and a transaction time and/or date; storing, in a merchant database, a plurality of merchant profiles, wherein each merchant profile includes data related to a merchant including at least a merchant identifier and a merchant geolocation associated with the related merchant; identifying, in the transaction database, a first set of transaction data entries, wherein each transaction data entry in the first set includes a common merchant identifier; identifying, in the transaction database, a second set of transaction data entries, wherein each transaction data entry in the second set includes a different merchant identifier where the merchant geolocation included in a corresponding merchant profile is within a predetermined distance of the merchant geolocation included in a specific merchant profile that includes the common merchant identifier; transmitting, by a transmitting device, at least an identification value associated with the account identifier included in each transaction data entry in the first set of transaction data entries and each transaction data entry in the second set of transaction data entries to a probe operator; receiving, by a receiving device, one or more geolocation data entries for each of the transmitted identification values from the probe operator, wherein each geolocation data entry includes the corresponding identification value, a location time and/or date, and a geolocation; and identifying, by a processing device, an updated merchant geolocation for the merchant related to the specific merchant profile based on the geolocation included in received geolocation data entries that correspond to transaction data entries in the first set of transaction data entries based on correspondence between the account identifier associated with the identification value and the location time and/or date in the respective geolocation data entry and the account identifier and transaction time and/or date in the respective transaction data entry.

A system for inferring a merchant geolocation includes a transaction database, a merchant database, a processing device, a transmitting device, and a receiving device. The transaction database is configured to store a plurality of transaction data entries, wherein each transaction data entry includes data related with a payment transaction including at least an account identifier associated with a payment account involved in the related payment transaction, a merchant identifier associated with a merchant involved in the related payment transaction, and a transaction time and/or date. The merchant database is configured to store a plurality of merchant profiles, wherein each merchant profile includes data related to a merchant including at least a merchant identifier and a merchant geolocation associated with the related merchant. The processing device is configured to: identify, in the transaction database, a first set of transaction data entries, wherein each transaction data entry in the first set includes a common merchant identifier; and identify, in the transaction database, a second set of transaction data entries, wherein each transaction data entry in the second set includes a different merchant identifier where the merchant geolocation included in a corresponding merchant profile is within a predetermined distance of the merchant geolocation included in a specific merchant profile that includes the common merchant identifier. The transmitting device is configured to transmit at least an identification value associated with the account identifier included in each transaction data entry in the first set of transaction data entries and each transaction data entry in the second set of transaction data entries to a probe operator. The receiving device is configured to receive one or more geolocation data entries for each of the transmitted identification values from the probe operator, wherein each geolocation data entry includes the corresponding identification value, a location time and/or date, and a geolocation. The processing device is further configured to identify an updated merchant geolocation for the merchant related to the specific merchant profile based on the geolocation included in received geolocation data entries that correspond to transaction data entries in the first set of transaction data entries based on correspondence between the account identifier associated with the identification value and the location time and/or date in the respective geolocation data entry and the account identifier and transaction time and/or date in the respective transaction data entry.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

System for Inferring Merchant Geolocations

Figure 1:
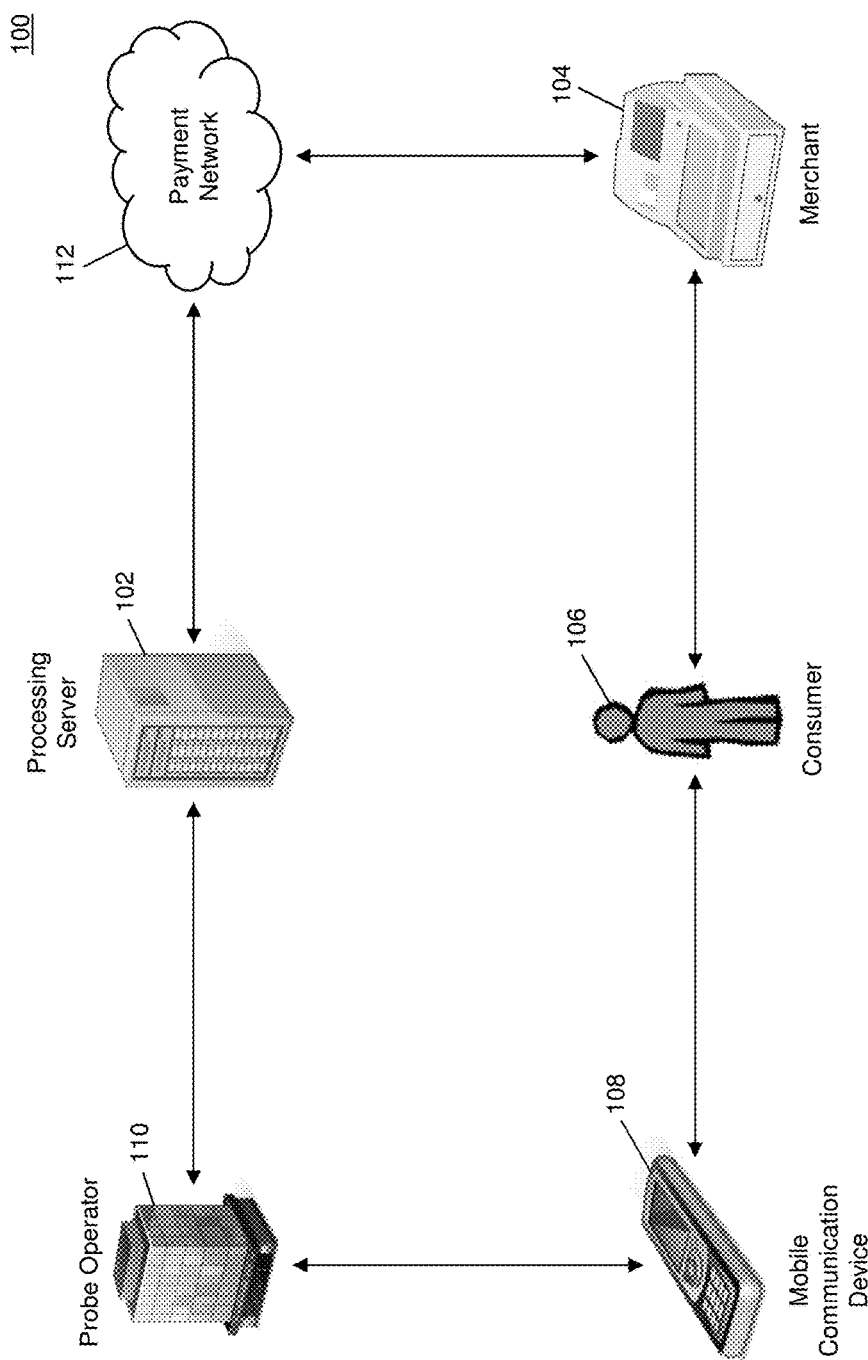
FIG. 1 is a high level architecture illustrating a system for the maintaining of privacy in the inference of merchant geolocations in accordance with exemplary embodiments.

FIG. 1 illustrates a system 100 for the inference of merchant geolocations using mobile device geolocation data and transaction data, and for the maintaining of the privacy of mobile device users.

The system 100 may include a processing server 102. The processing server 102, discussed in more detail below, may be configured to infer merchant geolocations based on identified correspondences between mobile device geolocation data and transactions linked to the mobile devices. In order to infer a merchant geolocation, the processing server 102 may first identify a merchant 104 whose geolocation is to be inferred and/or updated. The merchant 104 may be any merchant with a physical location at which consumers 106 may engage in payment transactions.

Each consumer 106 may possess a mobile communication device 108. The mobile communication device 108 may be any suitable type of computing device that is configured to transmit its geographic location to a probe operator 110. The mobile communication device 108 may be, for example, a cellular phone, smart phone, smart watch, personal navigation device, tablet computer, laptop computer, or any other suitable mobile device as will be apparent to persons having skill in the relevant art. The probe operator 110 may be a mobile network operator, communication network operator, cellular communication network provider, device manufacturer, or other entity configured to identify geolocations of mobile communication devices 108, and may use any suitable method for the identification of geolocations, which may include cellular network triangulation, Wi-Fi, wireless network, local area networking, radio frequency, near field communication, etc.

The probe operator 110 may regularly receive geolocation data from each mobile communication device 108 regarding its current geographic location. In some embodiments, the probe operator 110 may receive updated geographic location data every thirty seconds, sixty seconds, ninety seconds, or one hundred twenty seconds. Periods of time for the receipt of updated geolocation information will be apparent to persons having skill in the relevant art and may be based on a variety of criteria, including the probe operator 110, mobile communication device manufacture and settings, consumer 106 preferences, requirements set by the processing server 102, application of the data, etc.

The consumers 106 may conduct payment transactions at a plurality of merchants 104. Each payment transaction may be processed by a payment network 112 using traditional methods and systems that will be apparent to persons having skill in the relevant art. Transaction data for each of the payment transactions may be transmitted to the processing server 102 for storage, as discussed in more detail below. In some embodiments, the processing server 102 may be a part of the payment network 112. In a further embodiment, the processing server 102 may be configured to perform payment transaction processing for the payment network 112, such as processing payment transactions involving the merchant 104 and consumers 106.

As discussed in more detail below, the processing server 102 may identify the merchant 104 for inferring an updated geolocation. As part of the process, the processing server 102 may identify a plurality of consumers 106 that transacted at the merchant 104, as well as a plurality of other consumers 106 that transacted at other merchants located near the merchant 104 whose geolocation is to be updated. The processing server 102 may then send identification values for each of those consumers to the probe operator 110. The identification values may be device identifiers, media access control addresses, usernames, serial numbers, or other suitable values for identification that the probe operator 110 may use to identify the mobile communication device 108 associated with each consumer 106.

For example, in some embodiments, the probe operator 110 may first provide the processing server 102 with a list of identification values associated with consumers 106 and matching account identifiers. For instance, the list provided by the probe operator 110 may include a payment account number and mobile communication device 108 media access control address for each of a plurality of consumers 102 for whom the probe operator 110 collects geolocation data. The processing server 102 may then use the list to select identification values for each of the consumers 102 that transacted at the merchant 104 and other nearby merchants for transmission to the probe operator 110.

The probe operator 110 may then identify geolocation data for each of the mobile communication devices 108 associated with the consumers 106 based on the provided identification values. The geolocation data may be for a period of time specified by the processing server 102, such as corresponding to a period of time that encompasses the payment transactions identified by the processing server 102. In some instances, the processing server 102 may identify a period of time that exceeds a range of times for the payment transactions, as to obscure the data such that the probe operator 110 may be unable to identify the conducting of payment transactions by the consumers 106. In addition, by requesting geolocation data for consumers 106 that shopped at multiple merchants, the probe operator 110 may be unable to identify merchants that consumers 106 transacted with, or if a consumer 106 engaged in a payment transaction at all, thereby maintaining the consumer's 106 privacy with respect to the consumer's spending habits or pattern.

The processing server 102 may receive the geolocation data from the probe operator 110 and may match geolocation data entries to transaction data, such as by identifying a geolocation data entry at the same time and/or date as a transaction for a specific consumer 106. The processing server 102 may then identify an updated geolocation for the merchant 104 based on the geolocation data matched to payment transactions involving the consumers 106 involved in transactions with the merchant 104. In some embodiments, the processing server 102 may be configured to update the merchant geolocation at multiple merchants, such as the other merchants located near the merchant 104.

In some instances, the processing server 102 may provide updated merchant geolocation data to the probe operator 110. In some cases, the processing server 102 may wait a predetermined period of time prior to providing the probe operator 110 with the updated merchant geolocation data, such that the probe operator 110 may be unable to match the merchant 104 whose location was updated to consumers 106 to identify consumers 106 that successfully transacted with the merchant 104.

By updating merchant geolocations using mobile communication device 108 geolocation data, the processing server 102 may be able to infer merchant geolocations with greater accuracy and efficiency than using traditional methods. In addition, by requesting geolocation data for a plurality of consumers, including consumers that did not transact at the merchant 104 whose location is being updated, the processing server 102 may be able to update the merchant geolocation without sacrificing consumer privacy. Due to the obfuscation of the data, the probe operator 110 may be unable to determine which consumers whose geolocation data is requested actually engaged in a payment transaction, and with which merchant, thus maintaining the consumers' privacy. In addition, use of hashed account identifiers, discussed in more detail below, may further increase consumer privacy as not even the account identifiers may be shared between entities. Furthermore, additional methods for the protection of consumer privacy may be used in conjunction with those discussed herein for even greater protection, such as by requiring consumers to opt-in, enable consumers to opt-out, requiring probe operators 110, merchants 104, etc. to agree to privacy protection mechanisms, etc.

The methods and systems discussed herein may also be suitable for identifying m-commerce, MOTO, and e-commerce merchants as well. For instance, if the geolocation data for consumers that transacted at a specific merchant indicate that each of the consumers were in a significantly different location at the time of the transaction, it may indicate that the transactions were e-commerce or other types of remote transactions. As a result, the processing server 102 may infer that the merchant 104 is an online merchant rather than a merchant with a physical, brick and mortar geolocation.

Processing Server

Figure 2:
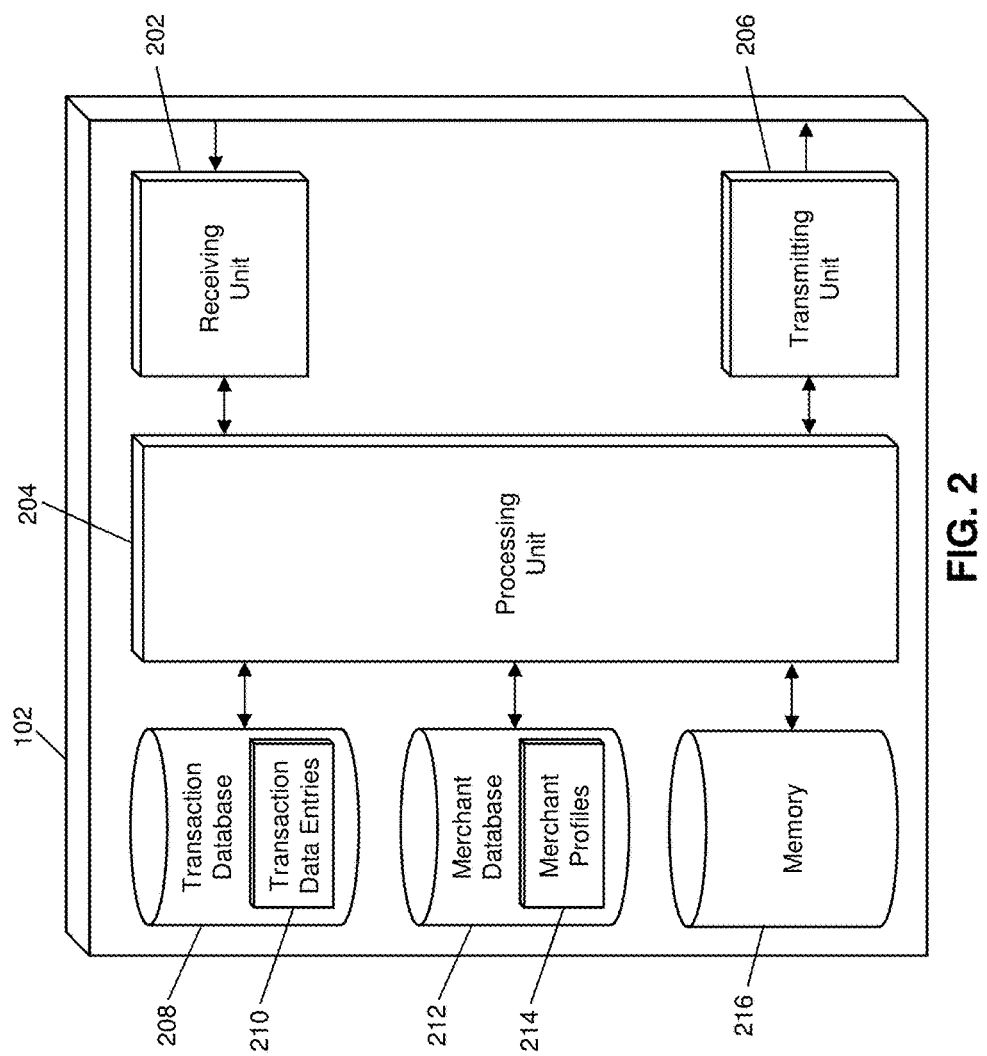
FIG. 2 is a block diagram illustrating the processing server of FIG. 1 for the inference of merchant geolocations in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving unit 202. The receiving unit 202 may be configured to receive data over one or more networks via one or more network protocols. The receiving unit 202 may receive transaction data for a plurality of payment transactions, such as from the payment network 112, or from a merchant 104 and/or an acquirer (e.g., an acquiring bank) associated with a merchant 104 as part of a payment transaction being processed by the payment network 112 and/or the processing server 102. The transaction data for each payment transaction may be stored in a transaction database 208 as one of a plurality of transaction data entries 210.

Each transaction data entry 210 may include data related to the corresponding payment transaction, which may include an account identifier associated with a payment account involved in the related transaction, such as associated with a consumer 106 involved in the transaction, a merchant identifier associated with a merchant 104 involved in the related transaction, and a transaction time and/or date. The account identifier may be any identification value suitable for identification of the payment account and/or associated consumer 106 involved in the payment transaction, such as a payment account number, username, e-mail address, telephone number, etc. In some instances, the account identifier may be a hashed value, such as a hash of a payment account number, as discussed in more detail below. The merchant identifier may be an identification value suitable for identification of the merchant 104 involved in the transaction, such as a merchant identification number. The transaction time and/or date may be a time and/or date at which the related transaction was processed (e.g., initiated, authorized, authenticated, cleared, finalized, etc.).

The processing server 102 may also include a merchant database 212. The merchant database 212 may be configured to store a plurality of merchant profiles 214. Each merchant profile 214 may include data related to a merchant 104 including at least a merchant identifier and a merchant geolocation associated with the related merchant. The merchant geolocation may be represented in any format suitable for the representation of a geolocation, such as coordinates (e.g., latitude and longitude), a street address, a zip code or postal code, etc.

The processing server 102 may further include a processing unit 204. The processing unit 204 may be configured to identify a first set of transaction data entries 210 that include a common merchant identifier associated with a merchant 104 whose geolocation is to be updated. The merchant 104 whose geolocation is to be updated may be identified by the processing unit 204, or may be based on data received by the receiving unit 202, such as a request from the probe operator 110 for an updated geolocation for the specified merchant 104. In some embodiments, each transaction data entry 210 in the first set may include a transaction time and/or date during a predetermined period of time (e.g., a single day, a range of hours, a range of days, etc.).

The processing unit 204 may also be configured to identify a second set of transaction data entries 210. Each transaction data entry 210 in the second set may include a different merchant identifier from the common merchant identifier, and may be associated with a merchant 104 whose geolocation (e.g., based on the geolocation included in the respective merchant profile 214) is within a predetermined distance of the merchant geolocation for the merchant 104 whose location is being updated. The predetermined distance may be based on any number of criteria, including the geolocation of the merchant 104 being updated, the industry of the merchant 104, rules regarding consumer privacy, etc.

The processing unit 204 may then identify identification values associated with each of the account identifiers included in the transaction data entries 210 included in the first and second sets of transaction data entries 210. The identification values may be a device identifier, media access control address, serial number, or other identifier associated with a mobile communication device 108 associated with the corresponding consumer 106, an arbitrary unique character string, or another type of identification value associated with the corresponding consumer 106, such as a username, phone number, e-mail address, etc. In some instances, the identification value may be the account identifier or a hashed and/or encrypted account identifier.

In some embodiments, the identification values may be based on data received by the receiving unit 202, such as from the probe operator 110. For example, the probe operator 110 may transmit a list of identification values and corresponding account identifiers to the processing server 102, such as based on data gathered during the usual course of business of the probe operator 110. The processing unit 204 may then identify transaction data entries 210 for each of the first and second sets for which the included account identifier has a corresponding identification value as provided by the probe operator 110.

The processing server 102 may also include a transmitting unit 206. The transmitting unit 206 may be configured to transmit data over one or more networks via one or more network protocols. The transmitting unit 206 may transmit the identification values corresponding to the account identifiers included in the transaction data entries 210 of the first and second sets to the probe operator 110. The transmission may also include a period of time for which geolocation data is requested, such as corresponding to the period of time for which the transaction data entries 210 in each set were selected.

The receiving unit 202 may be configured to receive geolocation data entries from the probe operator 110 in response to the transmission of the identification values to the probe operator 110. The receiving unit 202 may receive one or more geolocation data entries for each of the transmitted identification values, with each geolocation data entry including the corresponding identification value, a geolocation, and a time and/or date at which the geolocation was identified.

The processing unit 204 may be configured to match the transaction data entries 210 in the first set of transaction data entries to the geolocation data entries, by matching identification values and the times and/or dates included in the respective transaction data entries 210 and geolocation data entries, as discussed in more detail below and illustrated in FIG. 4. The processing unit 204 may then identify an updated geolocation for the merchant 104 being updated based on the geolocation included in each of the matched geolocation data entries. The merchant profile 214 may then be updated by the processing unit 204 with the identified updated geolocation. In some embodiments, the processing unit 204 may also perform the matching and updating for the merchants 104 involved in payment transactions in the second set of transaction data entries 210.

In some embodiments, the transmitting unit 206 may be further configured to transmit updated geolocation data to the probe operator 110. In some instances, the transmission of updated geolocation data may be after a predetermined period of time following the transmission of identification values to the probe operator 110 for the geolocation data used to identify the updated geolocation data. In some instances, the transmitting unit 206 may transmit the updated geolocation for a plurality of merchants at the same time, such as to obscure which merchant 104 was being updated following which geolocation data request, in order to maintain a high level of consumer privacy.

The processing server 102 may also include a memory 216. The memory 216 may be configured to store data suitable for performing the functions disclosed herein. For example, the memory 216 may store rules regarding the selection of merchant identifiers for updating, transaction data entries 210 for use in obtaining geolocation data, ratios of transaction data entries 210 in the first set to the second set, rules and/or algorithms for calculating updated merchant geolocations using the received geolocation data, and other data as will be apparent to persons having skill in the relevant art.

Process for Inferring an Updated Merchant Geolocation

Figure 3:
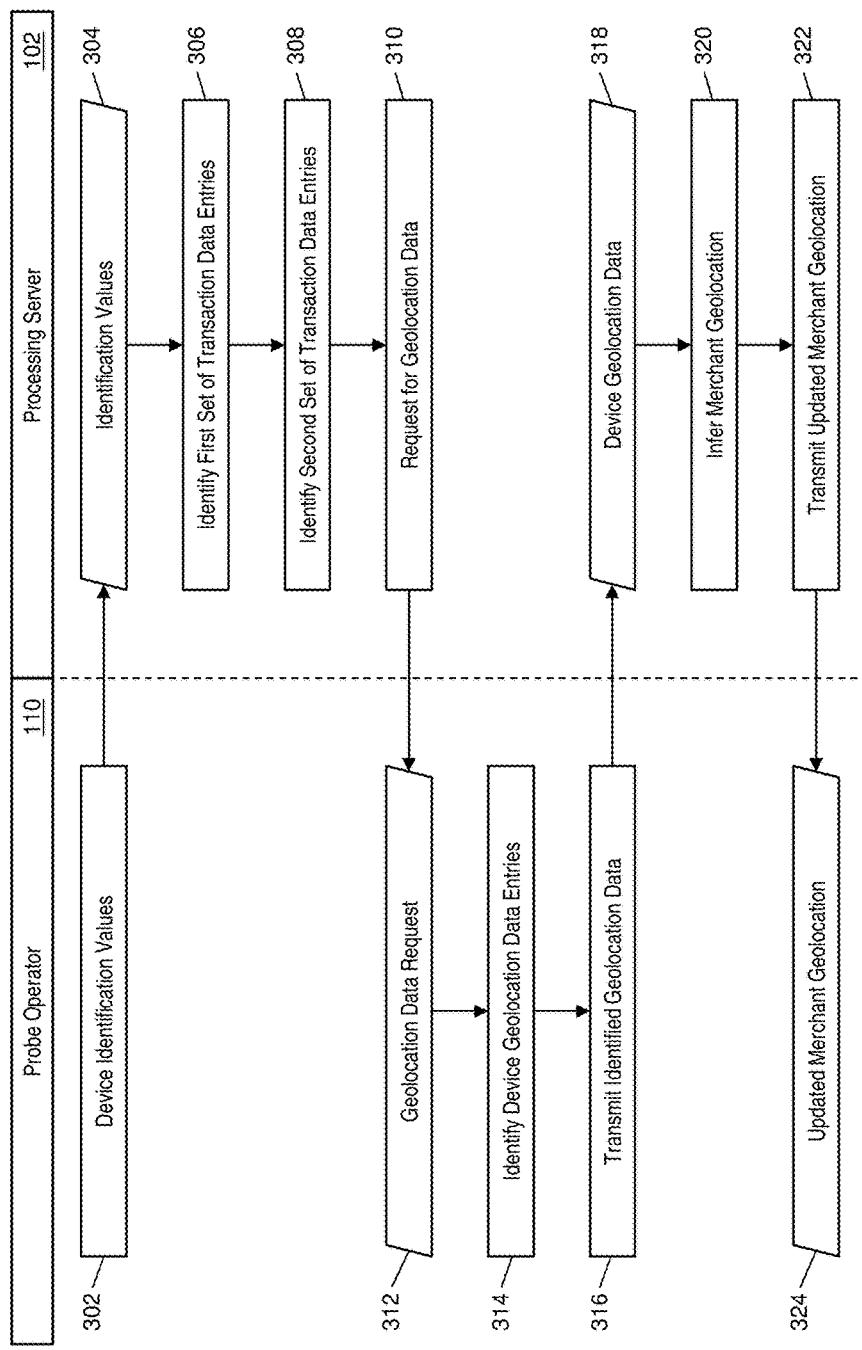
FIG. 3 is a flow diagram illustrating a process for inferring merchant geolocations based on mobile device geolocation data and transaction data using the system of FIG. 1 in accordance with exemplary embodiments.

FIG. 3 illustrates a process for the inferring of an updated geolocation for a merchant 104 using the processing server 102 and based on geolocation data of mobile communication devices 108 as provided by the probe operator 110.

In step 302, the probe operator 110 may identify a list of identification values for mobile communication devices 108 for which the probe operator 110 has geolocation data available. The list of identification values may include the identification value for each mobile communication device 108 as well as an account identifier associated with the mobile communication device 108 and/or a consumer 106 associated with the mobile communication device 106. The list of identification values may be transmitted to the processing server 102. In step 304, the receiving unit 202 of the processing server 102 may receive the list of identification values.

In some embodiments, the processing unit 204 may generate a look-up table, matching table, matching algorithm, or other suitable type of tool for matching account identifiers to identification values based on the received list. In other embodiments, the received list of identification values may not include corresponding account identifiers. In such an embodiment, the processing unit 204 may be configured to identify account identifiers corresponding to the received list of identification values using methods or systems that will be apparent to persons having skill in the relevant art, such as methods described in U.S. Patent Publication No. 2014/0129596, entitled "Methods for Geotemporal Fingerprinting," by Justin Xavier Howe, filed Nov. 8, 2012 or U.S. Patent Publication No. 2013/0290119, entitled "Method for Providing Payment Card Security Using Registrationless Telecom Geolocation Capture," by Howe et al., filed Apr. 27, 2012, both of which are hereby incorporated by reference in their entirety.

In step 306, the processing unit 204 may identify a first set of transaction data entries 210. Each transaction data entry 210 in the first set may include a common merchant identifier associated with a merchant 104 whose geolocation is to be updated, an account identifier associated with a transaction account used to fund the payment transaction, and may also include a transaction time and/or date included in a predetermined period of time. The processing unit 204 may also identify the identification value associated with the account identifier included in each transaction data entry 210 in the first set, such as based on the received list of identification values, the generated look-up table, etc.

In step 308, the processing unit 204 may identify a second set of transaction data entries 210. Each transaction data entry 210 in the second set may include one of a plurality of merchant identifiers different than the common merchant identifier, each of which may be associated with a merchant 104 located near the merchant 104 whose geolocation is to be updated. The proximity of location may be based on a plurality of criteria, such as the industry of the merchant 104 whose location is being updated, the geolocation of the merchant 104 whose location is being updated, and additional criteria that will be apparent to persons having skill in the relevant art. The processing unit 204 may also identify the identification value associated with the account identifier included in each transaction data entry 210 in the second set.

In step 310, the transmitting unit 206 of the processing server 102 may transmit a request for geolocation data to the probe operator 110, wherein the request includes at least the identification values identified for each of the transaction data entries 210 included in the first and second set of transaction data entries 210, and a period of time for which geolocation data is requested. In some embodiments, the period of time may correspond to the predetermined period of time used in identification of the transaction data entries 210.

In step 312, the probe operator 110 may receive the geolocation data request. In step 314, the probe operator 110 may identify geolocation data entries for each identification value included in the request for the requested period of time. In step 316, the probe operator 110 may transmit the geolocation data entries to the processing server 102. In step 318, the receiving unit 202 of the processing server 102 may receive the geolocation data entries, each geolocation data entry including the corresponding identification value, the geolocation, and the time and/or date when the geolocation was identified.

In step 320, the processing unit 204 may infer an updated geolocation for the merchant 104 being updated based on the geolocation included in each geolocation data entry that matches a transaction data entry 210 in the first set of transaction data entries 210 based on correspondence between the identification value of the geolocation data entry and account identifier of the transaction data entry 210 and the time and/or date of the geolocation data entry the transaction time and/or date of the transaction data entry 210. The processing unit 204 may also update the corresponding merchant profile 214 to include the inferred updated merchant geolocation. In some embodiments, step 320 may be repeated for other merchants whose merchant identifiers were included in transaction data entries 210 in the second set of transaction data entries 210. In step 322, the transmitting unit 206 may transmit the updated merchant geolocation to the probe operator 110, which may receive the updated geolocation in step 324.

Inference of an Updated Merchant Geolocation

Figure 4:
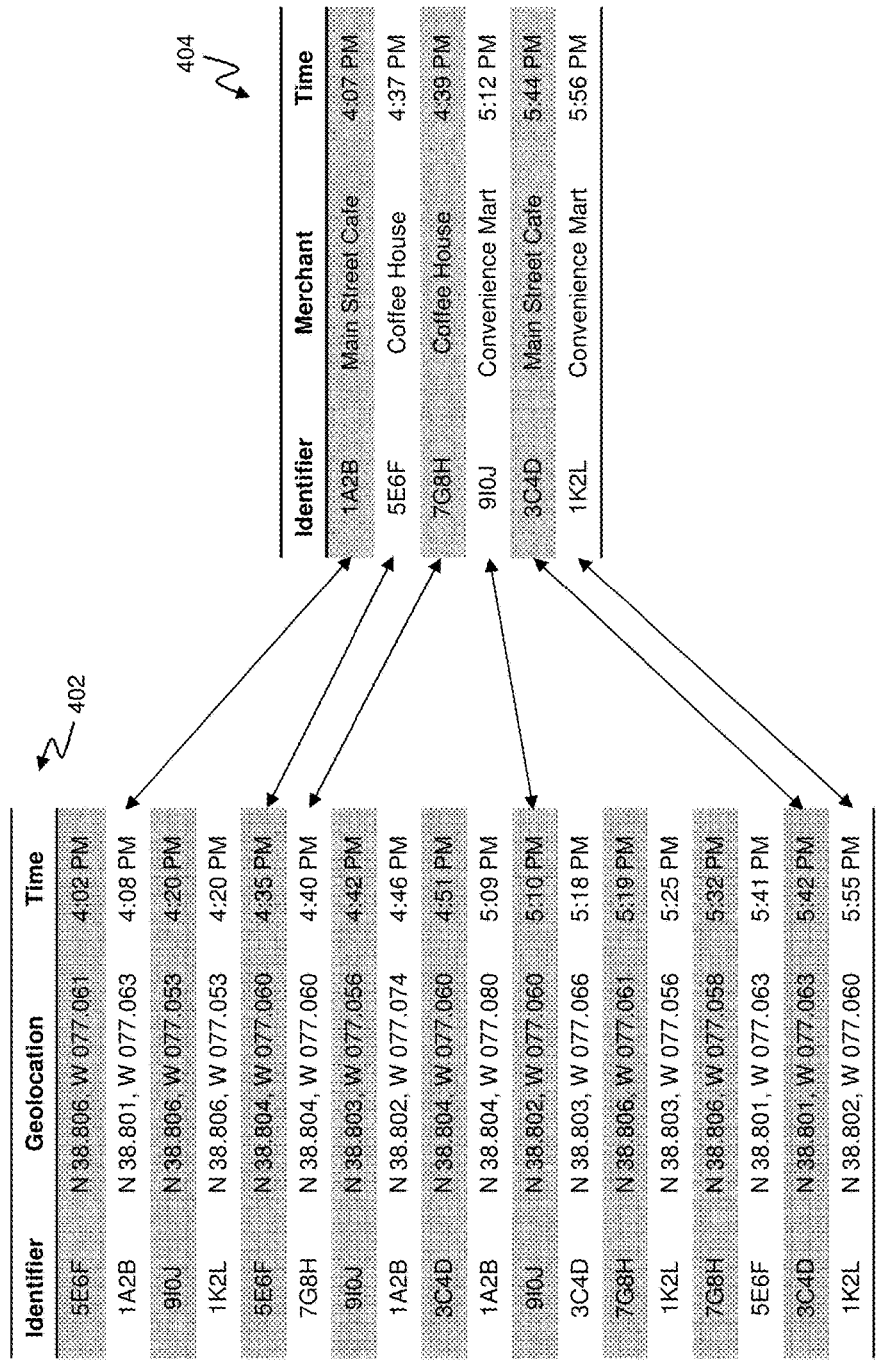
FIG. 4 is a diagram illustrating the matching of mobile device geolocation data to transaction data for use in inferring merchant geolocations in accordance with exemplary embodiments.

FIG. 4 illustrates the inference of an updated merchant geolocation based on geolocation data of a plurality of mobile communication devices 108 associated with consumers 106 involved in payment transactions with the merchant 104 whose geolocation is being updated.

Table 404 includes a plurality of transaction data entries 210 corresponding to merchants 104 the processing server 102 is to infer updated merchant geolocations for. As illustrated in FIG. 4, the processing server 102 may update the merchant geolocation for several merchants at once, such as to prohibit the probe operator 110 from identifying transactions conducted by the consumers 106. However, it will be apparent to persons having skill in the relevant art that the processing server 102 may update a single merchant geolocation using the methods and systems discussed herein, with other transactions being identified to obfuscate the merchant being updated, such as by including a plurality of transactions from other (e.g., nearby) merchants 104 whose locations are not being updated, or by identifying a plurality of transactions that all occur in a predetermined area and using the resulting geolocation data to infer merchant geolocations for one or more of the merchants 104 in the area. It will also be apparent to persons having skill in the relevant art that the number of transaction data entries 210 identified and whose corresponding identification values are transmitted to the probe operator 110 may be of a large number (e.g., 10,000 or more) so as to further prohibit the probe operator 110 from identifying individual transactions conducted by individual consumers 106.

In the example illustrated in table 404 of FIG. 4, the processing server 102 has identified three sets of transaction data entries 210, each of which includes two transaction data entries 210 having a common one of three different merchant identifiers, associated with one of the Main Street Café, Coffee House, and Convenience Mart. Each of the transaction data entries 210 includes a different identification value, such as the identification value 1A2B corresponding to an account identifier of a payment account involved in the transaction at the Main Street Café at 4:07 PM.

The processing server 102 may provide each of the six identification values to the probe operator 110 as well as a period of time for which geolocation data for each of the six identification values is requested. In the illustrated example, the processing server 102 requests geolocation data for each of the six identification values from between 4 PM and 6 PM. The probe operator 110 then identifies geolocation data entries for each of the identification values during the specified time, and provides the data to the processing server 102. The resulting geolocation data entries are illustrated in table 402.

The processing unit 204 may then match the geolocation data entries to the transaction data entries 210 based on matching between the identification values and the times of the geolocation and transaction. As illustrated in FIG. 4, the processing unit 204 may identify a geolocation data entry that matches each of the transaction data entries 210 identified for use in updating merchant geolocations.

The processing unit 204 may then update the geolocation for each of the three merchants based on the geolocations of the matched geolocation data entries. In the illustrated example, the processing unit 204 would therefore infer the geolocation of the Main Street Café to be at N 38.801, W 077.063, the Coffee House to be at N 38.804, W 077.063, and the Convenience Mart to be at N 38.806, W 077.060. The geolocations in the corresponding merchant profiles 214 may be updated, and the transmitting unit 206 of the processing server 102 may transmit the updated geolocations to the probe operator 110.

By requesting geolocation data for a plurality of identification values that did not transact at a particular merchant, the processing server 102 may be able to identify updated merchant geolocations while prohibiting the probe operator 110 from using the data to match consumers 106 to transactions with that particular merchant via their mobile communication devices 108, and thereby maintain consumer privacy.

Exemplary Method for Inferring Merchant Geolocations

Figure 5:
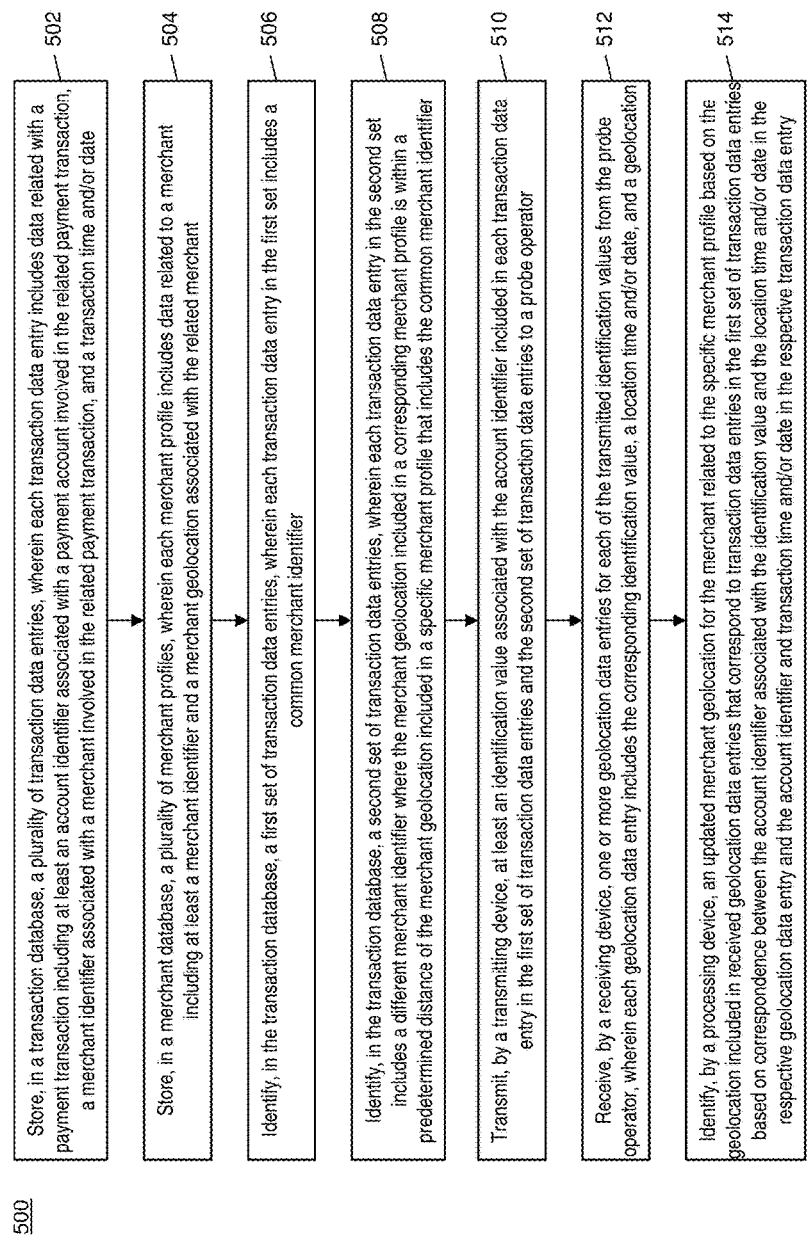
FIG. 5 is a flow chart illustrating an exemplary method for inferring a merchant geolocation in accordance with exemplary embodiments.

FIG. 5 illustrates a method 500 for the inferring of merchant geolocations based on correspondence between mobile device geolocation data and transaction data.

In step 502, a plurality of transaction data entries (e.g., transaction data entries 210) may be stored in a transaction database (e.g., the transaction database 208), wherein each transaction data entry 210 includes data related with a payment transaction including at least an account identifier associated with a payment account involved in the related payment transaction, a merchant identifier associated with a merchant involved in the related payment transaction, and a transaction time and/or date.

In step 504, a plurality of merchant profiles (e.g., merchant profiles 214) may be stored in a merchant database (e.g., the merchant database 212), wherein each merchant profile 214 may include data related to a merchant (e.g., the merchant 104) including at least a merchant identifier and a merchant geolocation associated with the related merchant 104.

In step 506, a first set of transaction data entries maybe identified in the transaction database 208, wherein each transaction data entry 210 in the first set includes a common merchant identifier.

In step 508, a second set of transaction data entries may be identified in the transaction database 208, wherein each transaction data entry 210 in the second set includes a different merchant identifier where the merchant geolocation included in a corresponding merchant profile 214 is within a predetermined distance of the merchant geolocation included in a specific merchant profile 214 that includes the common merchant identifier. In one embodiment, the number of transaction data entries 210 in the second set may be greater than the number of transaction data entries 210 in the first set. In some embodiments, the different merchant identifier included in each transaction data entry 210 in the second set is one of a plurality of merchant identifiers other than the common merchant identifier. In a further embodiment, the merchant geolocation corresponding to each merchant identifier of the plurality of merchant identifiers may be included in a predetermined geographic area.

In step 510, at least an identification value associated with the account identifier included in each transaction data entry 210 included in the first set of transaction data entries and the second set of transaction data entries may be transmitted, by a transmitting device (e.g., the transmitting unit 206) to a probe operator (e.g., the probe operator 110). In some embodiments, the identification value may be at least one of: a device identifier, a media access control address, a serial number, a hashed value of the associated account identifier, a username, and a phone number.

In step 512, one or more geolocation data entries may be received from the probe operator 110, by a receiving device (e.g., the receiving unit 202), for each of the transmitted identifications values, wherein each geolocation data entry includes the corresponding identification value, a location time and/or date, and a geolocation. In some embodiments, the received geolocation data entries may not include any personally identifiable information and the included geolocations may not be home locations for consumers (e.g., the consumers 106) associated with the corresponding account identifiers.

In step 514, an updated merchant geolocation for the merchant 106 related to the specific merchant profile 214 may be identified by a processing device (e.g., the processing unit 204) based on the geolocation included in received geolocation data entries that correspond to transaction data entries 210 in the first set of transaction data entries based on correspondence between the account identifier associated with the identification value and the location time and/or date in the respective geolocation data entry and the account identifier and transaction time and/or date in the respective transaction data entry 210.

In one embodiment, the method 500 may further include updating, in the merchant database 212, the merchant geolocation in the specific merchant profile 214 to the identified updated merchant geolocation. In some embodiments, the method 500 may also include transmitting, by the transmitting device 206, the identified updated merchant geolocation to the probe operator. In one embodiment, the method 500 may further include receiving, by the receiving device 202, a merchant geolocation request from the probe operator 110, wherein the merchant geolocation request includes the common merchant identifier.

In some embodiments, the method 500 may also include receiving, by the receiving device 202, a list of account identifiers or a list of identification values associated with account identifiers from the probe operator, wherein the account identifier included in each transaction data entry 210 included in the first set or second set is included in the received list of account identifiers or is associated with an identification value in the received list of identification values. In a further embodiment, each identification value in the received list of identification values is associated with a mobile communication device (e.g., the mobile communication device 108) whose geolocation data is available to the probe operator 110.

Computer System Architecture

Figure 6:
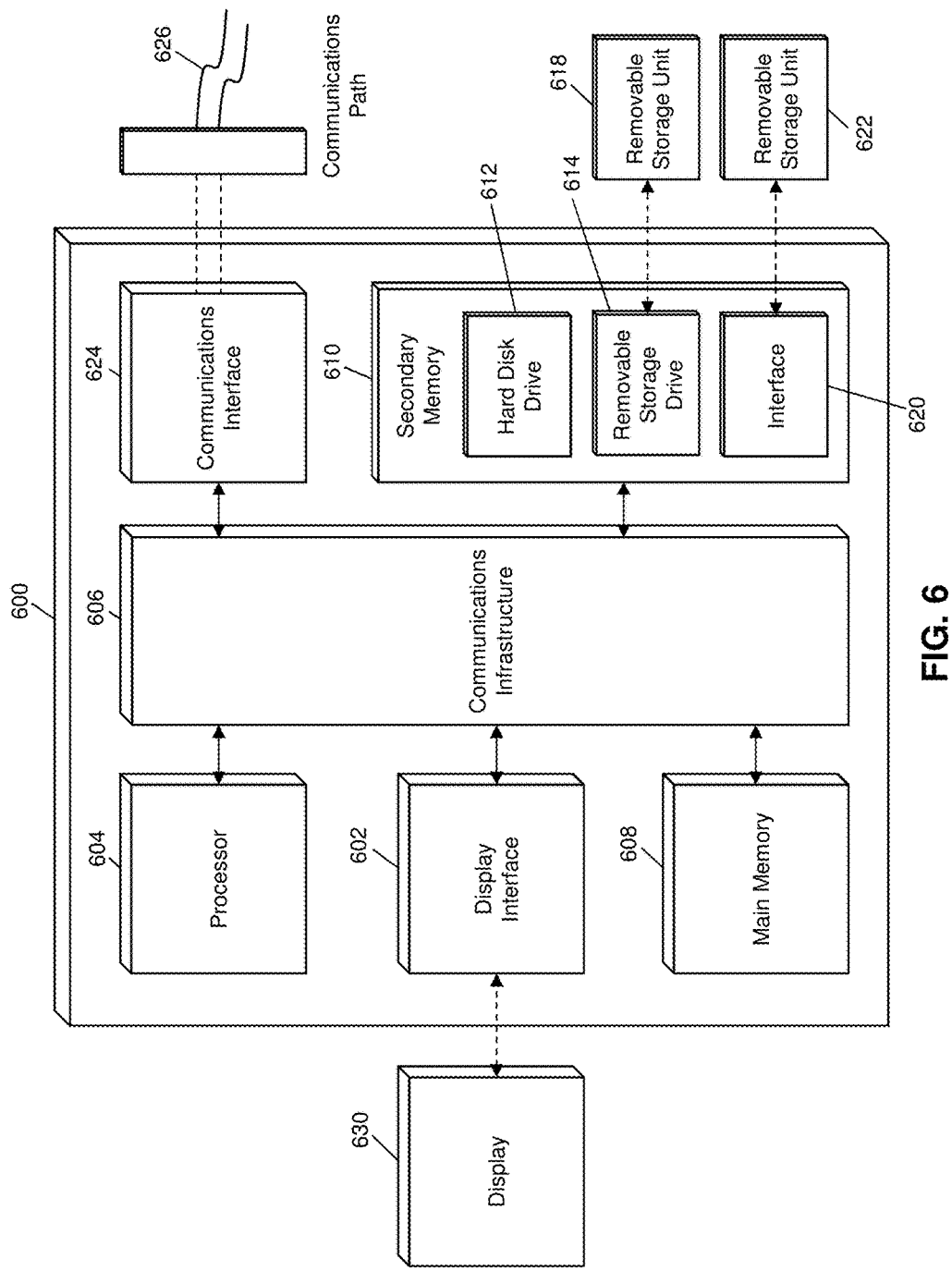
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3 and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

Techniques consistent with the present disclosure provide, among other features, systems and methods for inferring merchant geolocations. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for inferring a merchant geolocation, comprising:
   storing, in a transaction database of a processing server, a plurality of transaction data entries, wherein each transaction data entry includes data related with a payment transaction including at least an account identifier associated with a payment account involved in the related payment transaction, a merchant identifier associated with a merchant involved in the related payment transaction, and a transaction time and/or date;
   storing, in a merchant database of the processing server, a plurality of merchant profiles, wherein each merchant profile includes data related to a merchant including at least a merchant identifier and a merchant geolocation associated with the related merchant;
   identifying, in the transaction database of the processing server, a first set of transaction data entries, wherein each transaction data entry in the first set includes a common merchant identifier;
   determining, in the merchant database of the processing server, a first set of merchant profiles of the plurality of merchant profiles that each includes a respective merchant geolocation that is within a predetermined distance of the merchant geolocation included in a first merchant profile of the plurality of merchant profiles that includes the common merchant identifier that is included in each of the transaction data entries in the identified first set of transaction data entries;
   identifying, in the transaction database, a second set of transaction data entries of the plurality of transaction data entries that each includes a different merchant identifier, where each of the different merchant identifiers are respectively included in each of the determined first set of merchant profiles;
   transmitting, by a transmitting device of the processing server, at least an identification value associated with the account identifier included in each transaction data entry in the first set of transaction data entries and each transaction data entry in the second set of transaction data entries to a probe operator;
   receiving, by a receiving device of the processing server, one or more geolocation data entries for each of the transmitted identification values from the probe operator, wherein each geolocation data entry includes the corresponding identification value, a location time and/or date, and a geolocation;
   determining, by a processing device of the processing server, an updated merchant geolocation for the merchant related to the first merchant profile of the plurality of merchant profiles based on the geolocation included in received geolocation data entries that correspond to transaction data entries in the first set of transaction data entries based on correspondence between the account identifier associated with the identification value and the location time and/or date in the respective geolocation data entry and the account identifier and transaction time and/or date in the respective transaction data entry; and
   transmitting, by the transmitting device of the processing server, a message comprising the determined updated merchant geolocation to the probe operator to cause an update to one or more consumer devices connected to a hardware-based communication network of the probe operator, wherein transmitting the message comprises transmitting the determined updated merchant geolocation to the probe operator to cause a change in a mapping application executing on the one or more consumer devices connected to the hardware-based communication network of the probe operator.

2. The method of claim 1, further comprising:
   updating, in the merchant database, the merchant geolocation in the first merchant profile to the determined updated merchant geolocation.

3. The method of claim 1, wherein the received geolocation data entries do not include any personally identifiable information and the included geolocations are not home locations for consumers associated with the corresponding account identifiers.

4. The method of claim 1, wherein the identification value is at least one of: a device identifier, a media access control address, a serial number, a hashed value of the associated account identifier, a username, and a phone number.

5. The method of claim 1, wherein the number of transaction data entries in the second set of transaction data entries is greater than the number of transaction data entries in the first set of transaction data entries.

6. The method of claim 1, wherein the different merchant identifier included in each transaction data entry in the second set of transaction data entries is one of a plurality of merchant identifiers other than the common merchant identifier.

7. The method of claim 1, further comprising:
   receiving, by the receiving device, a merchant geolocation request from the probe operator, wherein the merchant geolocation request includes the common merchant identifier.

8. The method of claim 1, further comprising:
   receiving, by the receiving device, a list of account identifiers or a list of identification values associated with account identifiers from the probe operator, wherein
   the account identifier included in each transaction data entry included in the first set of transaction data entries or the second set of transaction data entries is included in the received list of account identifiers or is associated with an identification value in the received list of identification values.

9. The method of claim 8, wherein each identification value included in the received list of identification values is associated with a mobile communication device whose geolocation data is available to the probe operator.

10. A system for inferring a merchant geolocation, comprising:
    a transaction database of a processing server configured to store a plurality of transaction data entries, wherein each transaction data entry includes data related with a payment transaction including at least an account identifier associated with a payment account involved in the related payment transaction, a merchant identifier associated with a merchant involved in the related payment transaction, and a transaction time and/or date;

a merchant database of the processing server configured to store a plurality of merchant profiles, wherein each merchant profile includes data related to a merchant including at least a merchant identifier and a merchant geolocation associated with the related merchant;

a processing device of the processing server configured to
identify, in the transaction database of the processing server, a first set of transaction data entries, wherein each transaction data entry in the first set includes a common merchant identifier, and determine, in the merchant database of the processing server, a first set of merchant profiles of the plurality of merchant profiles that each includes a respective merchant geolocation that is within a predetermined distance of the merchant geolocation included in a first merchant profile of the plurality of merchant profiles that includes the common merchant identifier that is included in each of the transaction data entries in the identified first set of transaction data entries;

identify, in the transaction database of the processing server, a second set of transaction data entries of the plurality of transaction data entries that each includes a different merchant identifier, where each of the different merchant identifiers are respectively included in each of the determined first set of merchant profiles;

a transmitting device of the processing server configured to transmit at least an identification value associated with the account identifier included in each transaction data entry in the first set of transaction data entries and each transaction data entry in the second set of transaction data entries to a probe operator; and a receiving device of the processing server configured to receive one or more geolocation data entries for each of the transmitted identification values from the probe operator, wherein each geolocation data entry includes the corresponding identification value, a location time and/or date, and a geolocation, wherein the processing device of the processing server is further configured to determine an updated merchant geolocation for the merchant related to the first merchant profile of the plurality of merchant profiles based on the geolocation included in received geolocation data entries that correspond to transaction data entries in the first set of transaction data entries based on correspondence between the account identifier associated with the identification value and the location time and/or date in the respective geolocation data entry and the account identifier and transaction time and/or date in the respective transaction data entry, and the transmitting device of the processing server is further configured to transmit a message comprising the determined updated merchant geolocation to the probe operator to cause an update to one or more consumer devices connected to a hardware-based communication network of the probe operator, wherein the transmitting device is further configured to transmit the determined updated merchant geolocation to the probe operator to cause a change in a mapping application executing on the one or more consumer devices connected to the hardware-based communication network of the probe operator.

11. The system of claim 10, wherein the processing device is further configured to update, in the merchant database, the merchant geolocation in the specific merchant profile to the determined updated merchant geolocation.

12. The system of claim 10, wherein the received geolocation data entries do not include any personally identifiable information and the included geolocations are not home locations for consumers associated with the corresponding account identifiers.

13. The system of claim 10, wherein the identification value is at least one of: a device identifier, a media access control address, a serial number, a hashed value of the associated account identifier, a username, and a phone number.

14. The system of claim 10, wherein the number of transaction data entries in the second set of transaction data entries is greater than the number of transaction data entries in the first set of transaction data entries.

15. The system of claim 10, wherein the different merchant identifier included in each transaction data entry in the second set of transaction data entries is one of a plurality of merchant identifiers other than the common merchant identifier.

16. The system of claim 10, wherein the receiving device is further configured to receive a merchant geolocation request from the probe operator, wherein the merchant geolocation request includes the common merchant identifier.

17. The system of claim 10, wherein
the receiving device is further configured to receive a list of account identifiers or a list of identification values associated with account identifiers from the probe operator, and
the account identifier included in each transaction data entry included in the first set of transaction data entries or the second set of transaction data entries is included in the received list of account identifiers or is associated with an identification value in the received list of identification values.

18. The system of claim 17, wherein each identification value included in the received list of identification values is associated with a mobile communication device whose geolocation data is available to the probe operator.

* * * * *